June 27, 1950 H. W. GOODALL 2,512,741
HOSE COUPLING
Filed April 17, 1945

INVENTOR
Howard W. Goodall
BY
Augustus B. Stoughton
ATTORNEY

WITNESS:
Rob't R. Kitchel

Patented June 27, 1950

2,512,741

UNITED STATES PATENT OFFICE 2,512,741

HOSE COUPLING

Howard W. Goodall, Aldan, Pa.

Application April 17, 1945, Serial No. 588,808

1 Claim. (Cl. 285—78)

The principal object of the present invention is to increase the strength of a hose coupling both in respect to its gripping action on the hose and in respect to its resistance to longitudinal strain. Another object of the invention is to effect a more equal distribution of strain upon the coupling.

Other objects of the invention will appear from the following description at the end of which the invention will be claimed.

In the following description reference will be made to the accompanying drawing forming part hereof and in which, Figure 1 is a top or plan view of a hose clamp embodying features of the invention.

Figure 1:
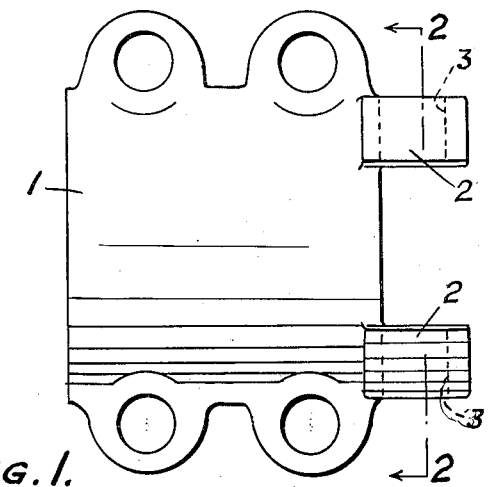
Figure 2:
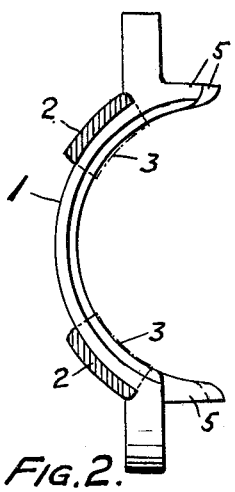
Figure 2 is a transverse sectional view taken on the line 2—2 of Figure 1.
Figure 3:
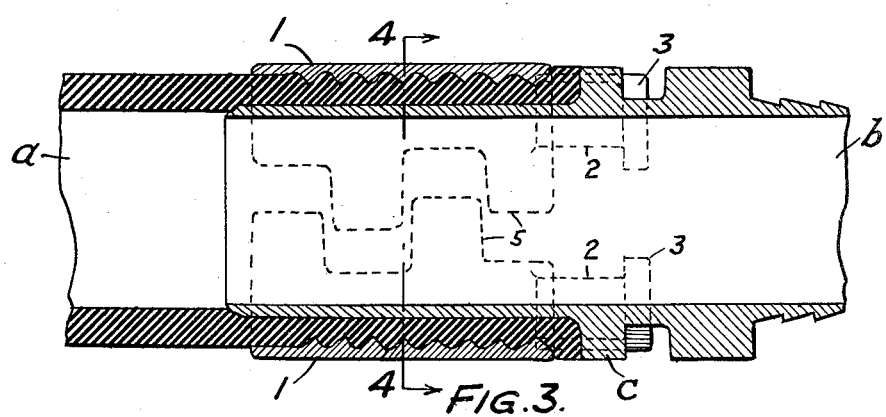
Figure 3 is a longitudinal sectional view illustrating a hose in association with a hose clamp.
Figure 4:
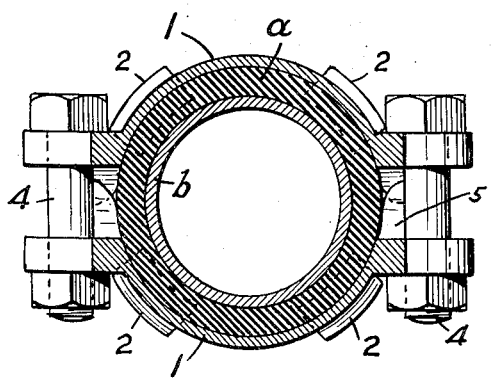
Figure 4 is a transverse sectional view taken on the line 4—4 of Figure 4.
Figure 5:
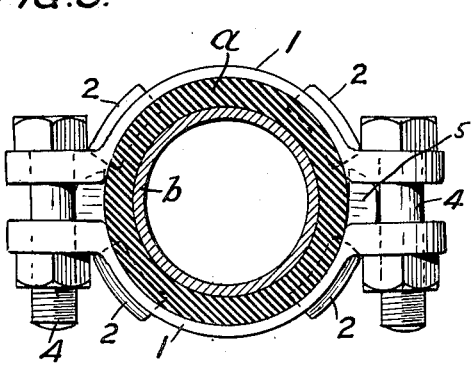
Figure 5 is a similar veiw showing an arrangement of hose and clamp of reduced diameter.

In the drawing reference is made to a hose clamp meaning and intending that two similar hose clamps are employed in pairs and that reference will be made to one of the clamps. A hose clamp 1 is provided with a plurality, two in the present instance, of locking fingers 2 having hooks 3. Internally and initially the surface of the hose clamp is cylindrical and when employed in connection with hose of smaller diameter the clamp is bent to approximately circular form by means of bolts 4. It may be remarked that the clamp, when extended, is circular in cross section and the clamp is contracted for smaller diameter hose, the bolts 4 being pulled up within reasonable and operative condition. It will be noted there is a larger area between bolt lugs and extension to ring 3 which permits of bending easily.

As usual the hose $a$ is clamped, example, upon the surface of a spud or the like $b$ which is provided with a flange $c$ with which the fingers 2, or more accurately the hooks 3, engage. It may be remarked that the hose clamp is initially internally semi-cylindrical for application to maximum diameter hose and for smaller sizes is bent to approximately cylindrical shape. The extensions and the locking fingers are relatively narrow and easily bendable.

The curved surface of the clamp is devoid of lumps or humps and is practically of the same thickness throughout. No lumps or humps in the center area or body of the clamp is present to resist bending so that its bendability is not impaired and the provision of more than one finger distributes the strain among them so that each finger may be comparatively small and may be joined to the end of the clamp without the employment of strengthening bulges or enlargements so that the bendability of the clamp is not lessened.

In cases where a rubber hose is connected with a relatively fixed spud the movements of the hose may tend to cant it in respect to the spud in various directions giving rise to injury to the hose or tending to cause leakage. However, inasmuch as the clamp engages the flange on the spud at four or more points this tendency is overcome. As usual overlapping extensions 5 are provided from the lateral edge of each clamp. These extensions are shown as interfitting and arranged with two spaced extensions on one edge of each clamp and two single and individual extensions one arranged on the opposite edge of each clamp.

I claim:

A hose clamp consisting of two identical one-piece clamp sections each of the general form of a segment of a hollow cylinder, each clamp section being of arcuate shape in its transverse cross-section with its opposite longitudinally extending edges respectively provided with perforated bolting lugs so disposed that upon assembly of said clamp sections the lugs of one clamp section are in substantially parallel confronting relation with respect to the corresponding lugs of the other clamp section, bolts for connecting said confronting lugs together, and a pair of circumferentially spaced hooked elements extending axially from a corresponding end of each clamp section, said elements being respectively spaced a substantial distance to either side of the longitudinally extending median plane of the clamp section from which they extend whereby to provide said clamp section with a relatively thin unobstructed central arcuate bendable portion of substantial transverse dimension and of substantially uniform thickness and bendability throughout.

HOWARD W. GOODALL.

REFERENCES CITED

The following references are of record in the file of this patent:

UNITED STATES PATENTS

| Number | Name | Date |
|---|---|---|
| 237,324 | Reynolds | Feb. 1, 1881 |
| 1,066,214 | Mulconroy et al. | July 1, 1913 |
| 1,249,380 | Goodall et al. | Dec. 11, 1917 |
| 1,720,781 | Deakins | July 16, 1929 |
| 1,745,295 | Greve | Jan. 28, 1930 |
| 2,166,524 | Goodall | July 18, 1939 |